(12) United States Patent
Lemberg et al.

(10) Patent No.: US 11,301,348 B2
(45) Date of Patent: Apr. 12, 2022

(54) COMPUTER NETWORK WITH TIME SERIES SEASONALITY-BASED PERFORMANCE ALERTS

(71) Applicant: Microsoft Technology Licensing, LLC, Redmond, WA (US)

(72) Inventors: Rachel Lemberg, Herzliya (IL); Raphael Fettaya, Tel Aviv (IL); Dor Bank, Tel Aviv (IL); Linoy Liat Barel, Modi'in (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 16/696,886

(22) Filed: Nov. 26, 2019

(65) Prior Publication Data
US 2021/0157702 A1 May 27, 2021

(51) Int. Cl.
*G06F 11/30* (2006.01)
*G06F 9/50* (2006.01)
(Continued)

(52) U.S. Cl.
CPC .......... *G06F 11/3072* (2013.01); *G06F 9/505* (2013.01); *G06F 11/3006* (2013.01); *G06F 11/321* (2013.01); *G06F 11/324* (2013.01); *G06F 3/067* (2013.01); *G06F 16/958* (2019.01); *H04L 41/14* (2013.01)

(58) Field of Classification Search
CPC .......... G06F 2209/5019; G06F 9/5016; G06F 11/0751; G06F 11/0766; G06F 11/3055; G06F 11/321; G06F 11/34; G06F 11/3409; G06F 11/3476; H04L 43/16; H04L 43/0876; H04L 65/80; H04L 67/322
See application file for complete search history.

(56) References Cited

U.S. PATENT DOCUMENTS 6,745,150 B1 6/2004 Breiman
9,933,338 B2 4/2018 Noda et al.
(Continued)

OTHER PUBLICATIONS

Chandra, et al., "Predicting Microclimate", Application as Filed in U.S. Appl. No. 15/962,833, filed Apr. 25, 2018, 76 Pages.
(Continued)

*Primary Examiner* — Barbara B Anyan
(74) *Attorney, Agent, or Firm* — Arent Fox LLP

(57) ABSTRACT

A computer platform for hosting applications utilizes a computing device to manage seasonal performance metric alerts. The computer device may include a memory and at least one processor coupled to the memory. The computer device may collect a time series of an application performance metric for a period of less than two weeks. The computer device may determine a daily distributions each day within the period. The computer device may apply a radial basis function (RBF) kernel-based change point detection to the time series to determine that the daily distributions include a weekend time period that has a different daily distribution than a time period before or after the weekend time period. The computer device may adjust a baseline prediction of the metric for the weekend time period. The computer device may send an alert based on a deviation of a value of the metric from the adjusted baseline prediction.

18 Claims, 6 Drawing Sheets

(51) Int. Cl.
*G06F 11/32* (2006.01)
*H04L 41/14* (2022.01)
*G06F 3/06* (2006.01)
*G06F 16/958* (2019.01)

(56) References Cited

U.S. PATENT DOCUMENTS

| | | | |
|---|---|---|---|
| 9,942,117 B1* | 4/2018 | Saini | H04L 41/14 |
| 10,172,567 B2 | 1/2019 | Moxon et al. | |
| 10,387,900 B2 | 8/2019 | Bledsoe et al. | |
| 10,671,431 B1* | 6/2020 | Dolan | G06F 3/067 |
| 2012/0259583 A1* | 10/2012 | Noboa | H02J 13/0062 |
| | | | 702/179 |
| 2013/0092704 A1* | 4/2013 | Tincher | A47L 15/4418 |
| | | | 222/1 |
| 2014/0058572 A1 | 2/2014 | Stein et al. | |
| 2014/0121830 A1* | 5/2014 | Gromley | G07F 9/026 |
| | | | 700/236 |
| 2015/0081399 A1* | 3/2015 | Mitchell | G08G 1/0129 |
| | | | 705/7.38 |
| 2015/0317589 A1 | 11/2015 | Anderson et al. | |
| 2017/0249445 A1 | 8/2017 | Devries et al. | |
| 2018/0284741 A1 | 10/2018 | Cella et al. | |
| 2019/0057197 A1* | 2/2019 | Wang | G06F 16/958 |
| 2019/0156253 A1 | 5/2019 | Malyack et al. | |
| 2019/0208445 A1* | 7/2019 | Klatsky | H04L 43/16 |

OTHER PUBLICATIONS

Espinoza, et al., "Time Series Prediction using LS-SVMs", In Proceedings of European Symposium on Time Series Prediction, vol. 8, Sep. 17, 2008, 10 Pages.

Harchaoui, et al., "Kernel Change-point Analysis", In Proceedings of the Twenty-Second Annual Conference on Neural Information Processing Systems, Dec. 8, 2008, pp. 1-8.

"International Search Report and Written Opinion Issued in PCT Application No. PCT/US20/058616", dated Feb. 17, 2021, 15 Pages.

Salfner, et al., "A Survey of Online Failure Prediction Methods", In Journal of ACM Computing Surveys, vol. 42, Issue 3, Mar. 29, 2010, 42 Pages.

* cited by examiner

COMPUTER NETWORK WITH TIME SERIES SEASONALITY-BASED PERFORMANCE ALERTS

BACKGROUND

Large-scale networked systems are provided as platforms employed in a variety of settings for running service applications and maintaining data for business and operational functions. Such networks can include and/or be a part of a data center (e.g., a physical cloud computing infrastructure) that may provide a variety of services (e.g., web applications, email services, search engine services, resource sharing services, etc.) for client computing devices connected to at least a portion of the network. These large-scale networked systems typically include a large number of resources distributed throughout the data center, where each resource can include or at least resemble a physical machine.

In the realm of telemetry for monitoring health of network resources, a vast number (e.g., billions) of metrics are collected from or for resources over a period of time (e.g., each second) of a given network. Due to the number of metrics, it can become difficult to keep track of the metrics and/or related signals, health status of the network resources, etc. In addition, when services experience issues, engineers that maintain the services and/or corresponding resources may be notified by system alarms tens or hundreds of times, and the engineers do not always know which alarm is the most important to respond to, or may miss important alarms due to the sheer number of alarms. Issues can also be caused by downstream dependencies, and without the necessary domain knowledge, it can be difficult to understand what signals are affecting a given service, and/or how to locate/determine a dependency that may ultimately be causing the issue.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

The disclosure provides an example computing device for managing seasonal performance metric alerts. The computer device may include a memory storing one or more parameters or instructions and at least one processor coupled to the memory. The at least one processor may be configured to collect a time series of an application performance metric for a period of less than two weeks. The at least one processor may be configured to determine daily distributions for each day within the time period. The at least one processor may be configured to apply a radial basis function (RBF) kernel-based change point detection to the time series to determine that the daily distributions include a weekend time period that has a different daily distribution than a time period before or after the weekend time period. The at least one processor may be configured to adjust a baseline prediction of the application performance metric for the weekend time period. The at least one processor may be configured to send an alert based on a deviation of a value of the application performance metric from the adjusted baseline prediction.

In another aspect, the disclosure provides a computer-implemented method for managing seasonal performance metric alerts. The method may include collecting a time series of an application performance metric for a period of less than two weeks. The method may include determining a daily distribution for each day within the period. The method may include applying a RBF kernel-based change point detection to the time series to determining that the daily distribution includes a weekend time period that has a different daily distribution than a time period before or after the weekend time period. The method may include adjusting a baseline prediction of the application performance metric for the weekend time period. The method may include sending an alert based on a deviation of a value of the application performance metric from the adjusted baseline prediction.

In another aspect, the disclosure provides an example non-transitory computer-readable medium, comprising code executable by one or more processors for managing seasonal performance metric alerts. The non-transitory computer-readable medium may include code for collecting a time series of an application performance metric for a period of less than two weeks. The non-transitory computer-readable medium may include code for determine daily distributions for each day of the time period. The non-transitory computer-readable medium may include code for applying RBF kernel-based change point detection to the time series to determine that the daily distribution includes a weekend time period that has a different daily distribution than a time period before or after the weekend time period. The non-transitory computer-readable medium may include code for adjusting a baseline prediction of the application performance metric for the weekend time period. The non-transitory computer-readable medium may include code for sending an alert based on a deviation of a value of the application performance metric from the adjusted baseline prediction.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

Figure 1:
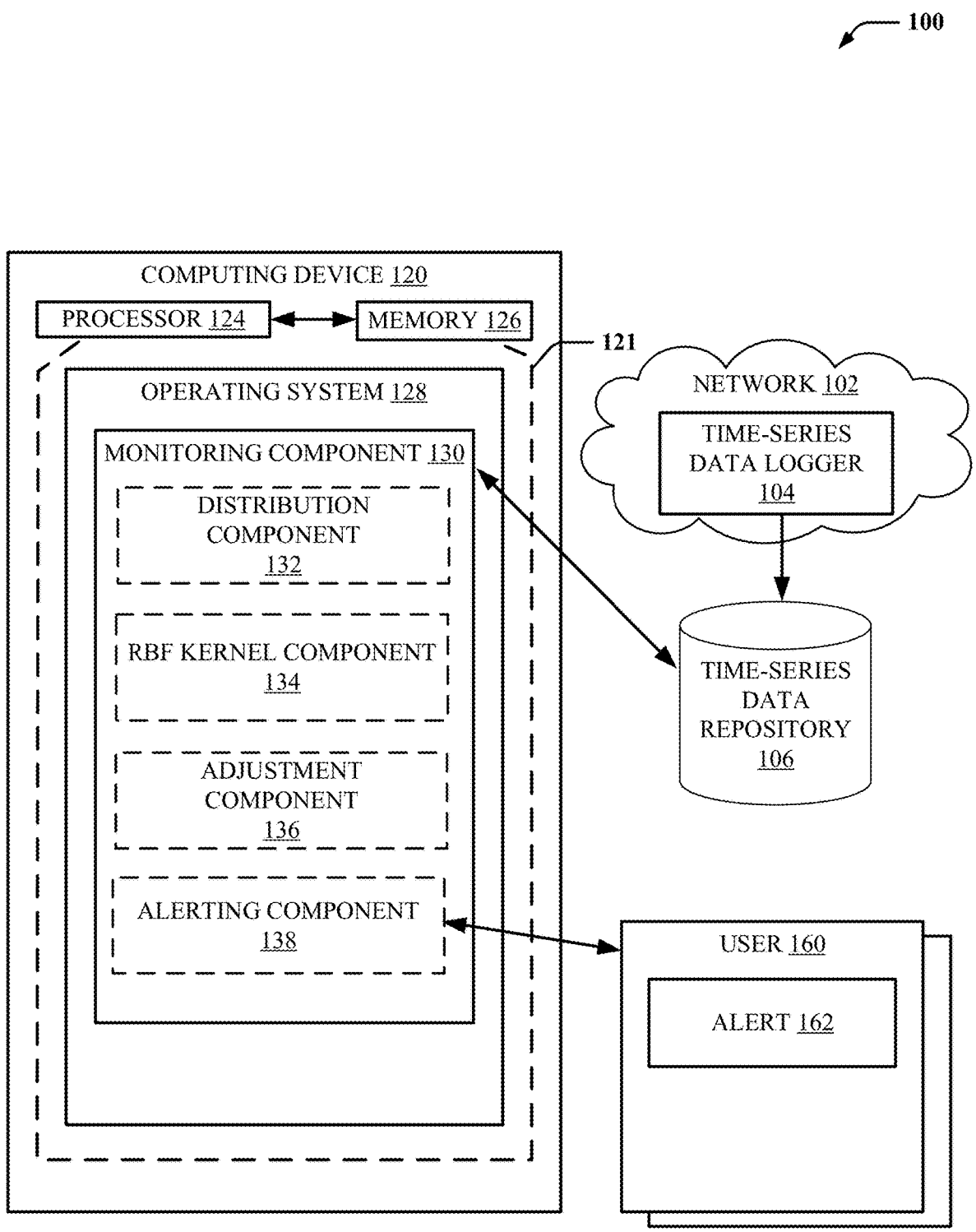
FIG. 1 is a schematic diagram of an example of a computing device for generating alerts based on a detected seasonality in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to detecting weekly seasonality of a metric of performance of a computer network. A computer network may provide a platform for hosting an application using various computing resources. The computer network may provide a monitoring service that provides information such as alerts to an operator of a hosted application. In an aspect, the monitoring service may be configured automatically, based on historical data, to detect deviations from an expected behavior. For instance, the monitoring service may employ dynamic thresholds to detect when a current metric deviates from an acceptable range for the metric. Such deviations may be related to a problem with the application. Accordingly, the monitoring service may provide alerts to trigger actions to remedy a problem in response to detecting a deviation.

For many metrics of a hosted application, the acceptable range for the metric is not constant. Instead, the normal values for the metric vary over time with a repeating pattern referred to as seasonality. Seasonality is defined to be the tendency of time-series data to exhibit behavior that repeats itself every fixed period of time. The term season is used to represent the period of time before behavior begins to repeat itself. For example, a daily seasonality may refer to a daily pattern of a metric. For instance, a number of requests for an application may be higher during business hours than in the middle of the night. A weekly seasonality may refer to a weekly pattern of the metric. Generally, metrics with a weekly seasonality have a different behavior on a weekend compared to other days of the week.

For a monitoring service with automatic dynamic thresholds, correctly determining the seasonality of a metric is important for accurate forecasting of expected values when setting the dynamic thresholds. In particular, a failure to identify weekly seasonality may lead to a large number of false alarms when weekend behavior differs from predicted behavior based on a daily seasonality. Automatically detecting weekend seasonality based on historical data, however, presents several difficulties. First, conventional techniques often involve correlating events over several periods to detect the seasonality. For example, a fast Fourier transform (FFT) may be applied to detect correlations over a time period. Such techniques, however, require at least two periods to correlate and accuracy is improved with a greater number of periods. In the context of an application monitoring service, multiple weeks of historical data may not be available for correlation. An application or configuration thereof may be less than several weeks old or may change such that older data not useful. In some cases, an application operator may not want to preserve historical metrics for the several weeks necessary to detect seasonality based on correlation.

Manual techniques for identifying weekly seasonality may be cumbersome and unreliable. For example, an application operator may not know how each metric is expected to behave on weekends or may not want to manually configure every metric. Assumptions about weekly seasonality, based on a calendar for example, may not be applicable in a global environment. In view of the foregoing, there is a need to determine seasonality of a time series based on shorter periods of time, e.g., based on data for a time period less than twice the seasonality of the time series.

Figure 4:
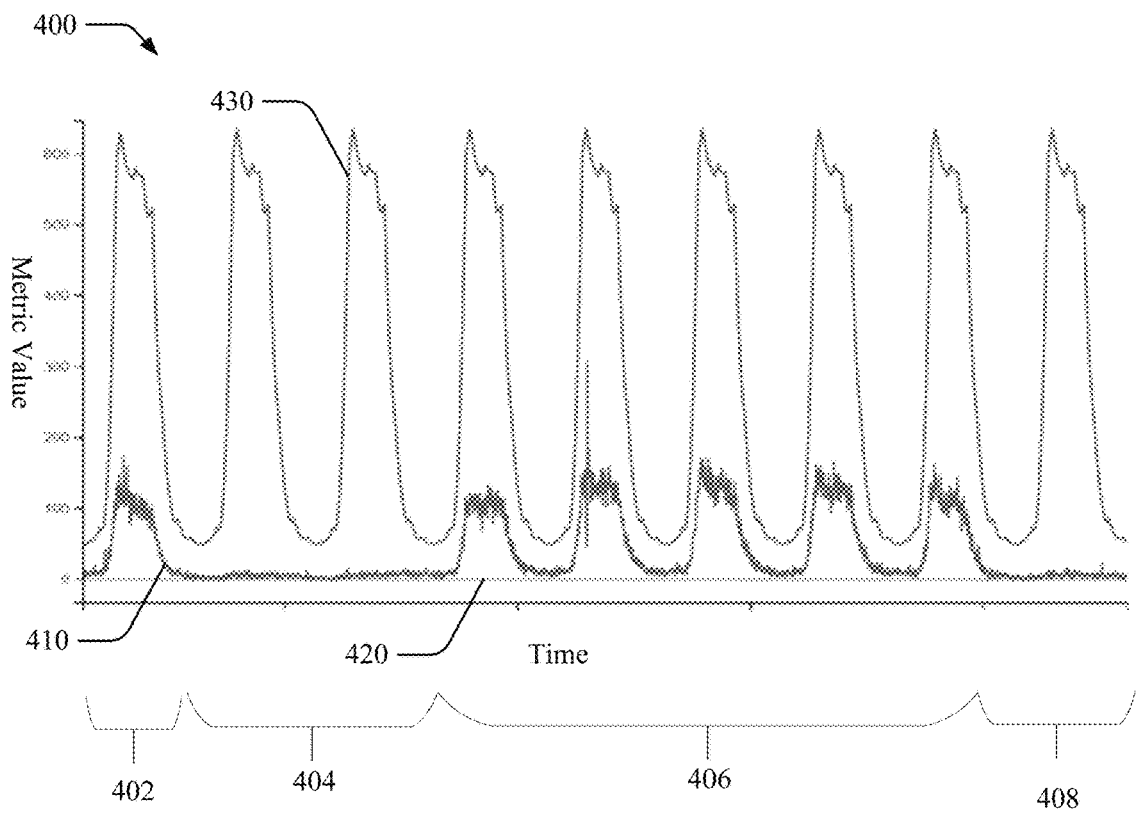
FIG. 4 is a graphical diagram of example dynamic thresholds for a time series of data instances over time (e.g., 9 days) based on a daily seasonality in accordance with examples described herein.
Figure 5:
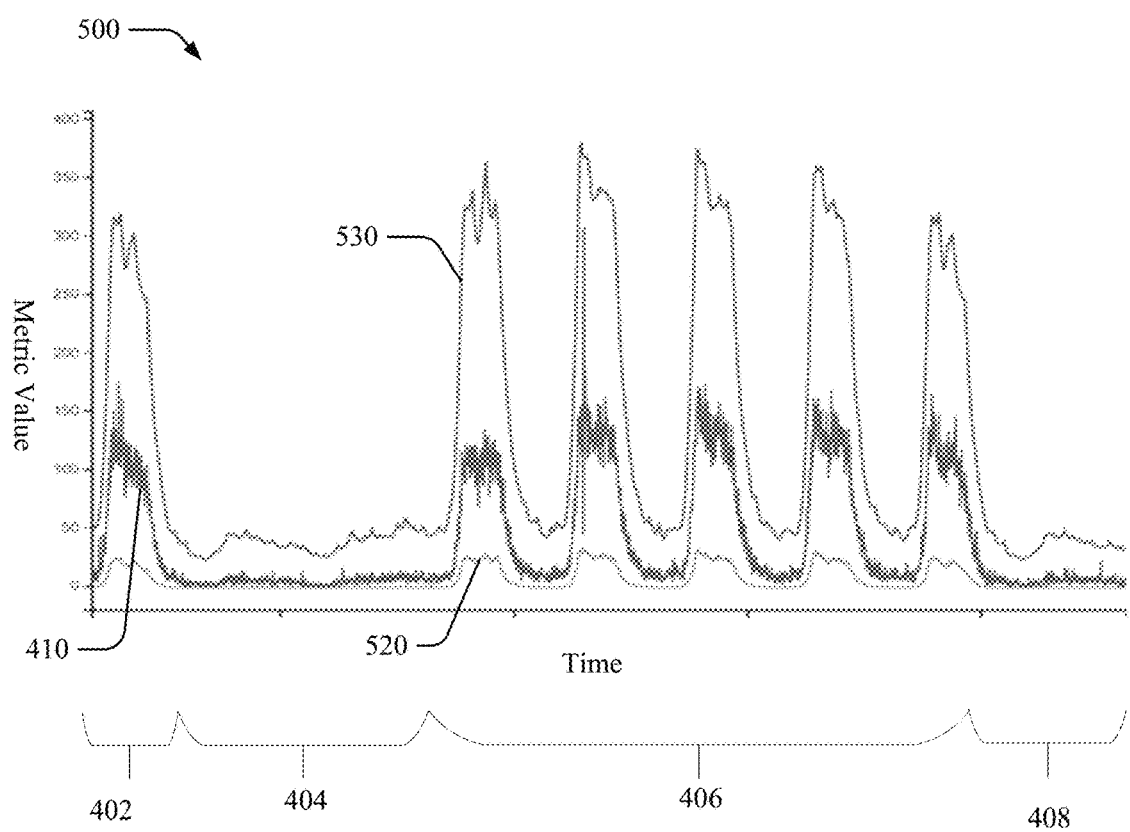
FIG. 5 is a graphical diagram of example dynamic thresholds for a time series of data instances over time (e.g., 9 days) based on a weekly seasonality in accordance with examples described herein.
Figure 6:
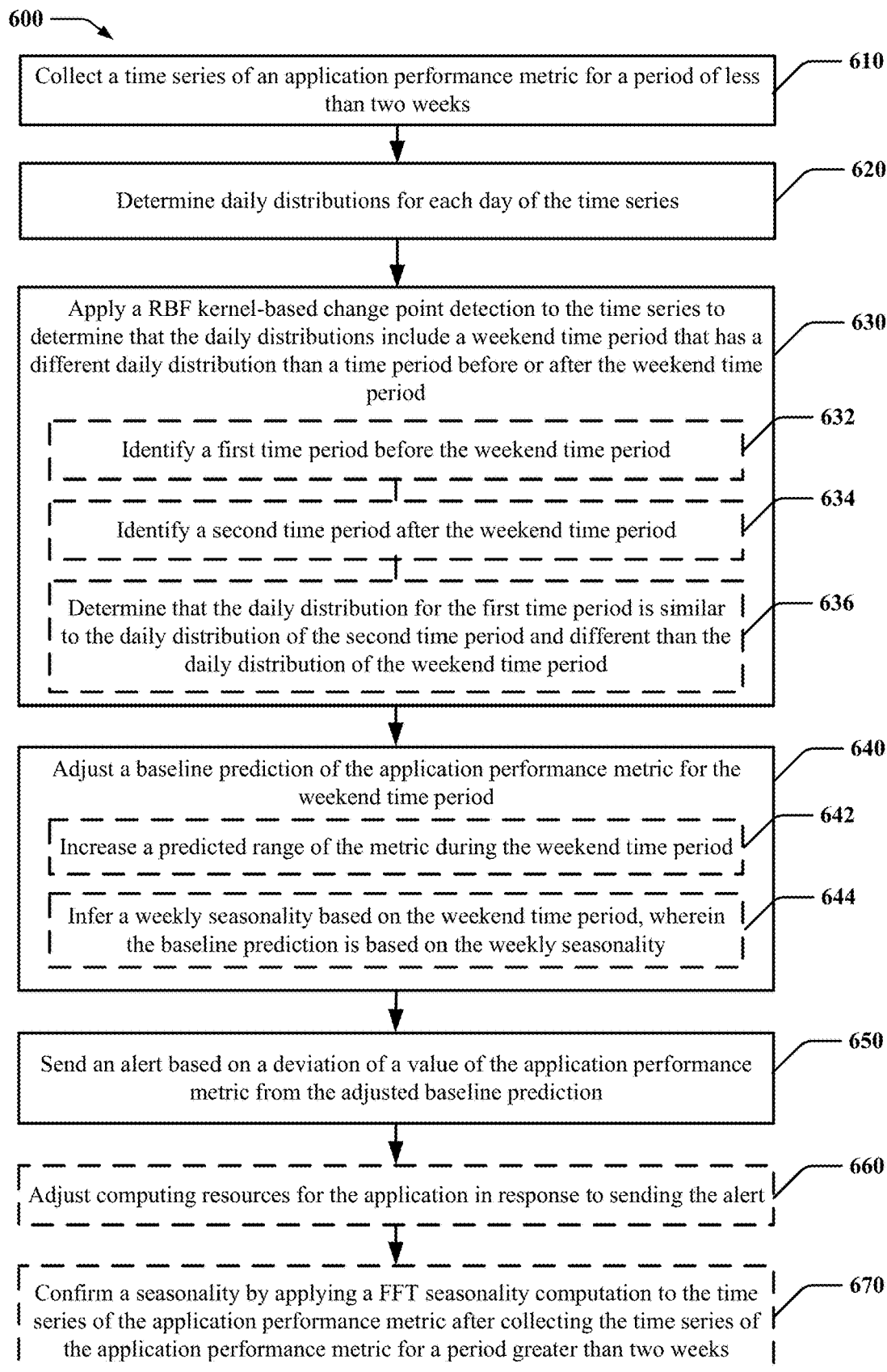
FIG. 6 is a flow diagram of an example method of generating alerts based on a detected seasonality in accordance with examples described herein.

Turning now to FIGS. 1-7, examples are depicted with reference to one or more components and one or more methods that may perform the actions or operations described herein, where components and/or actions/operations in dashed line may be optional. Although the operations described below in FIG. 6 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing system 100 that includes one or more networks, such as network 102, having one or more time-series data loggers 104 for logging time-series data occurring on resources of the network 102. For example, the resources of the network 102 may include various types of nodes, such as computing devices, databases, devices with a network-specific functionality, such as routers, bridges, firewalls, web servers, load balancers, and/or the like. Each resource may have an associated time-series data logger 104 to log time-series data in a time-series data repository 106, where the time-series data logger 104 may operate on the resource or otherwise to detect communications from the resource for logging the time-series data. In an example, the service events in time-series data repository 106 may include various types of time-series data, such as processor or memory utilization on the resource, throughput of traffic on the resource, application-specific events that are definable by applications executing on the resource, etc.

A computing device 120 is provided for exposing a framework to obtain time-series data from time-series data repository 106, determining weekly seasonality of the time-series data, and generating alerts for deviations from predicted behavior based on the weekly seasonality in accordance with aspects described herein. For example, computing device 120 can include or can otherwise be coupled with a processor 124 and/or memory 126, where the processor 124 and/or memory 126 can be configured to execute or store instructions or other parameters related to determining daily distributions for each day within the time period; applying a radial basis function (RBF) kernel-based change point detection to the daily distributions to determine that the daily distributions include a weekend time period that is different from a mean distribution; adjusting a baseline prediction of the application performance metric for the weekend time period; and sending an alert based on a deviation of a value of the application performance metric from the adjusted baseline prediction, as described herein.

For example, processor 124 and memory 126 may be separate components communicatively coupled by a bus (e.g., on a motherboard or other portion of a computing device, on an integrated circuit, such as a system on a chip (SoC), etc.), components integrated within one another (e.g., processor 124 can include the memory 126 as an on-board component 121), and/or the like. Memory 126 may store instructions, parameters, data structures, etc., for use/execution by processor 124 to perform functions described herein.

In an example, computing device 120 can execute an operating system 128 (e.g., via processor 124 and/or memory 126) for providing an environment for executing one or more components, procedures, or applications. For example, operating system 128 may execute a monitoring component 130 for receiving time-series data from the time-series data repository 106. In an aspect, the time series data may be an application performance metric. The time series data may be for a period of less than two weeks. The monitoring component 130 may include a distribution component 132 that determines daily distributions for each day within the time period, for example, by performing correlations using a FFT. The monitoring component 130 may include a RBF kernel component 134 that applies an RBF kernel-based change point detection to the time series to analyze the daily distributions. For example, the RBF kernel component 134 may compute a similarity measurement between two points in dimensions of infinite size and detect a mean shift value in an infinite-dimensional signal based on the similarity measurement. In an aspect, the RBF kernel component 134 may include an autoencoder that generates a plurality of low-dimensional vectors using temporal regularization. For instance, each of the plurality of low-dimensional vectors may correspond to a period in the time-series data. The monitoring component 130 may include a RBF kernel component 134 that determines whether the daily distribution includes a weekend time period that has a different daily distribution than a time period before or after the weekend time period. The monitoring component 130 may include an adjustment component 136 that adjusts a baseline prediction of the metric for the weekend time period. The monitoring component 130 may include an alerting component 138 that sends an alert 162 (e.g., to a user 160) based on a deviation of a value of the metric from the adjusted baseline prediction.

Figure 2:
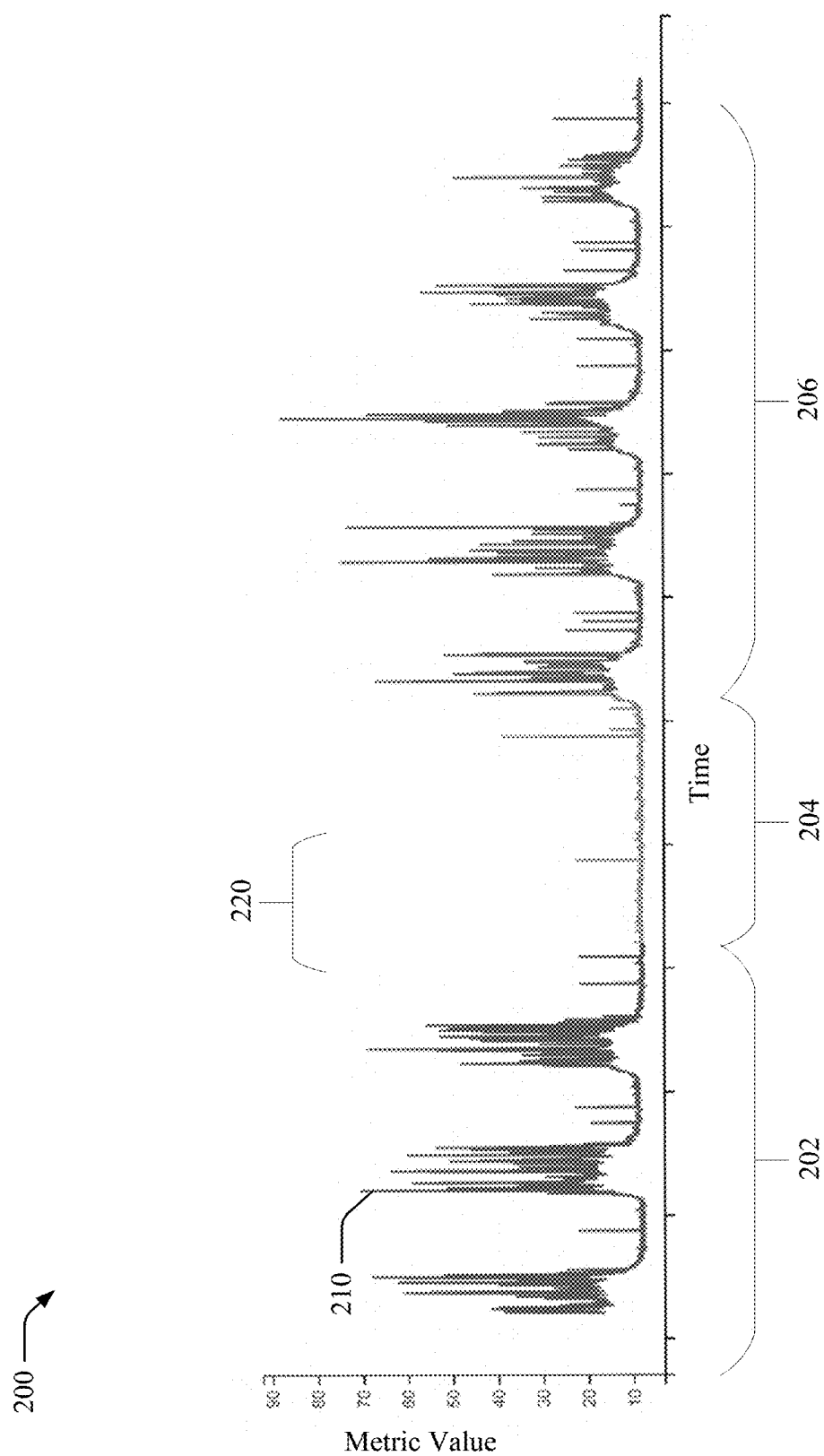
FIG. 2 is a graphical diagram of an example time series data distribution of data instances over time (e.g., 10 days) having a weekly seasonality in accordance with examples described herein.

FIG. 2 is a graphical diagram 200 of an example time series 210 having weekly seasonality. In an aspect, the distribution component 132 may analyze the time series 210 by determining a distribution for a 24 hour window 220. The RBF kernel component 134 may compare the distributions to determine where a change in distributions occurs. For example, the RBF kernel component 134 may identify a first time period 202 having a first distribution with a first mean, a second time period 204 having a second distribution with a second mean, and a third time period 206 having a third distribution with a third mean. Further, the RBF kernel component 134 may determine that the first mean of the first time period 202 is similar to the third mean of the third time period 206. For example, the means of two periods may be considered similar when a percent difference is less than a threshold such as 10%. The RBF kernel component 134 may determine that the second time period 204 that has a different distribution and a different mean than the first time period 202 and the third time period 206 is a weekend time period.

Figure 3:
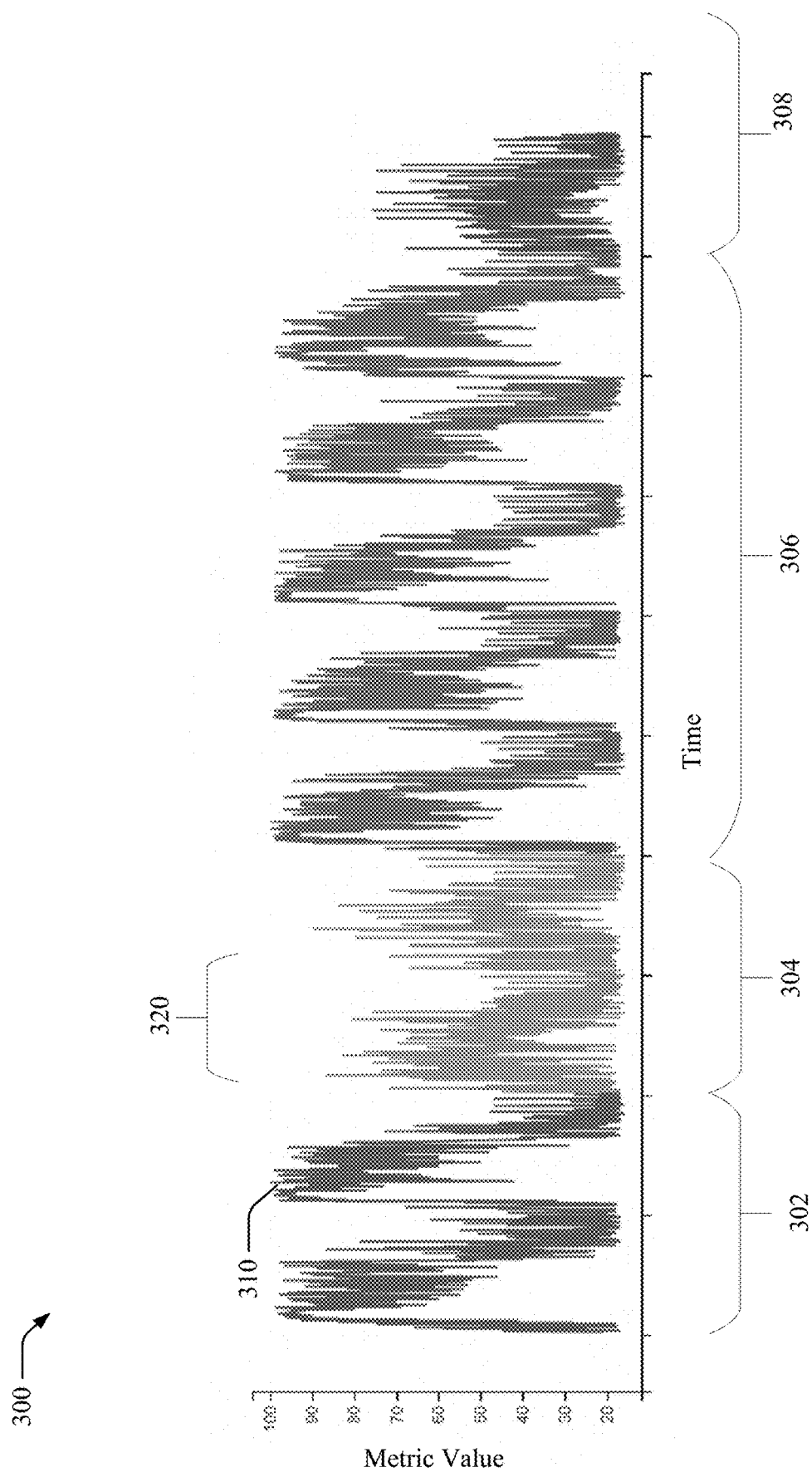
FIG. 3 is a diagram of another example time series data distribution over time (e.g., 10 days) having a weekly seasonality in accordance with examples described herein.

The RBF kernel component 134 may detect the weekend time period based on a single occurrence. That is, since the detection of the weekend time period is based on the differences of daily distributions rather than correlations, the RBF kernel component 134 may detect a weekly seasonality with less than two weeks of data. For instance, the RBF kernel component 134 may detect a weekend time period in less than one week of data where the data includes one day before the weekend time period and one day after the weekend time period. Further, in addition to detecting a likely weekly seasonality, the RBF kernel component 134 detects the location of the weekend time period. As discussed in further detail below, detecting the weekly seasonality and the weekend time period may allow a forecasting system to predict a baseline behavior for a future weekend time period. Accordingly, a monitoring system may set dynamic thresholds based on the baseline behavior for the weekend time period and may avoid false alarms when the metric changes according to the weekend time period FIG. 3 is another graphical diagram 300 of an example time series 310 having a weekly seasonality. As discussed above with respect to FIG. 2, the distribution component 132 may analyze the time series 310 by determining a distribution for a 24 hour window 320. The RBF kernel component 134 may compare the distributions to determine where a change in distributions occurs. For example, the RBF kernel component 134 may identify a first time period 302 having a first distribution with a first mean, a second time period 304 having a second distribution with a second mean, and a third time period 306 having a third distribution with a third mean. The RBF kernel component 134 may identify the second time period 304 as a weekend time period based on a difference between the second mean of the second distribution from the first mean of the first distribution and the third mean of the third distribution. The RBF kernel component 134 may predict a fourth time period 308 will also be a weekend time period. Accordingly, when the time series 310 has a similar distribution during the fourth time period 308 as in the second time period 304, the behavior may not trigger false alarms. The behavior of the time series 310 during the fourth time period 308 may be predicted based on the time periods 302, 304, and 306 before the fourth time period 308 begins.

FIG. 4 is a graphical diagram 400 of a time series 410 including dynamic thresholds 420, 430 based on a daily seasonality of the time series 410. That is, the lower dynamic threshold 420 and the upper dynamic threshold 430 may be set based on an assumption that the time series 410 has a daily seasonality, e.g., changes in a similar manner across a day. The time series 410, however, may actually have a weekly seasonality. For example, the distribution component 132 and the RBF kernel component 134 may identify a first time period 402 having a first distribution, a second time period 404 that is a weekend time period having a second distribution, a third time period 406 that has a third distribution similar to the first distribution, and a fourth period 408 that is a weekend time period having a fourth distribution that is similar to the second distribution.

The lower dynamic threshold 420 may be set to a constant value of 0 due in part to the low values during the weekend time periods 404 and 408. That is, because the time series has values close to 0 during the weekend time period 404 and 408, it appears that a value of 0 may be expected at any time. The upper dynamic threshold 430 may be based on the range of values (e.g., a variance) of the time series 410 at each particular time of day. Because of the weekend time periods 404 and 408, there are times of day when on one day (e.g., during time period 402) the value of the time series 410 reaches a peak, while at the same time on other days (e.g., during time period 404) the time series 410 is close to 0. Accordingly, the upper dynamic threshold 430 may have peaks that far exceed the actual peaks of the time series 410 due to the apparent variance of the time series 410. Accordingly, the dynamic thresholds 420 and 430 may not provide alerts even though a current metric value differs from the previously observed time series 410. Additionally, a false positive scenario may occur when the behavior during the weekend period differs from the other time periods. For example, the lower dynamic threshold 420 may be set based on an average of daily minimums, and a minimum value on a weekend, where the values are generally lower, may fall below the lower dynamic threshold 420.

FIG. 5 is a graphical diagram 500 of the time series 410 including dynamic thresholds 520, 530 based on a weekly seasonality of the time series 410, e.g., changes in a similar manner across a week. That is, the lower dynamic threshold 520 and the upper dynamic threshold 530 may be set based on detection of weekend time periods 404 and 408 by the distribution component 132 and the RBF kernel component 134 as discussed above.

The detection of the weekend time periods 404 and 408 may allow the adjustment component 136 to adjust a baseline prediction of the time series 410. For example, the adjustment component 136 may determine separate predictions for the normal time periods 402 and 406 and the weekend time periods 404 and 408. In another implementation, the adjustment component 136 may add a weekly seasonality component to the daily seasonality predictions discussed above with respect to FIG. 4.

The lower dynamic threshold 520 may have a value of 0 during the weekend time periods 404 and 408, but have an increased value in the middle of each regular day. Accordingly, the lower dynamic threshold 520 may generate alerts when the value of the metric remains close to 0 on a weekday. The upper dynamic threshold 530 may include peaks for each day during the normal time periods 402 and 406 and may have significantly lower values during the weekend time periods 404 and 408 that vary based on the low values observed during the weekend time periods 404 and 408. The peaks of the upper dynamic threshold 530 fit the time series 410 more closely than the peaks of the dynamic threshold 430. Due to the weekly seasonal component of the predictions, the shape of the peaks of the upper dynamic threshold 530 may have a shape corresponding to the time series 410 for the particular day. The upper dynamic threshold 530 includes high peaks due to the daily variation of the time series 410 on weekdays, but the peaks are not exaggerated due to variation between weekday and the weekend time periods 404 and 408. Accordingly, the upper dynamic threshold 530 may be more likely than the upper dynamic threshold 430 to generate an alert when there is an unusually high spike in the value of the metric during a weekday.

FIG. 6 is a flowchart of an example of a method 600 for providing alerts based on a detected seasonality of a time series. For example, method 600 can be performed by the computing device 120, and is accordingly described with reference to FIG. 1, as a non-limiting example of an environment for carrying out method 600.

In block 610, the method 600 may include collecting a time series of an application performance metric for a period of less than two weeks. In an aspect, for example, the computing device 120 and/or the processor 124 may execute the monitoring component 130 to collect a time series of an application performance metric for a period of less than two weeks. For instance, the monitoring component 130 may collect the time series from the time-series data logger 104 and/or the time-series data repository 106. The time series may be for a period of less than two weeks. For example, the period may be 1 week. In an implementation, the period may be as little as 3 days when the weekend period is one day.

In block 620, the method 600 may include determining a daily distribution for each day of the time series. In an aspect, for example, the computing device 120 and/or the processor 124 may execute the monitoring component 130 and/or the distribution component 132 to determine the daily distributions for each day of the time series. For instance, the distribution component 132 may utilize a sliding window of 24 hours to determine the daily distributions. For instance, the distribution component 132 may determine correlations using a fast Fourier transform (FFT).

In block 630, the method 600 may include applying a RBF kernel-based change point detection to the time series to determine that the daily distributions include a weekend time period that has a different daily distribution than a time period before or after the weekend time period. In an aspect, for example, the computing device 120 and/or the processor 124 may execute the monitoring component 130 and/or the RBF kernel component 134 to apply the RBF kernel-based change point detection to the time series to determine that the daily distributions include a weekend time period 204, 304, 404, 408 that has a different daily distribution than a time period before or after the weekend time period (e.g., time periods 202, 206, 302, 306, 402, 406). In an implementation, the RBF kernel-based change point detection may include computing a similarity measurement between two points in dimensions of infinite size, and detecting a mean shift value in an infinite-dimensional signal based on the similarity measurement. Further, the RBF kernel component 134 may determine the weekend time period based on a length of the different time periods. The RBF kernel component 134 may determine that a period that is different for one or two days is the weekend time period. The length may be defined by a number of hours (e.g., 22-50 hours, preferably 24-48 hours). The RBF kernel component 134 may additionally confirm the weekend time period based on comparison of different time periods. For example, at sub-block 632, the block 630 may optionally include identifying a first time period before the weekend time period. For instance, the RBF kernel component 134 may identify the time period 202, 302, or 402. At sub-block 634, the RBF kernel component 134 may include identifying a second time period after the weekend time period. For instance, the RBF kernel component 134 may identify the time period 206, 306, or 406 as being a time period after the weekend time period. At sub-block 636, the RBF kernel component 134 may optionally include determining that the daily distribution for the first time period is similar to the daily distribution of the second time period and different than the daily distribution of the weekend time period. For instance, the RBF kernel component 134 may determine that the daily distribution for the time period 202 is similar to the daily distribution of the time period 206 and different than the daily distribution for the weekend time period 204. In an aspect, the RBF kernel component 134 may determine that the daily distribution of the first time period 202 is similar to the daily distribution of the third time period 206 by removing the weekend time period 204 and determining whether the RBF kernel-based change point detection detects a change between the first time period 202 and the third time period 206.

In an implementation, the RBF kernel component 134 may utilize an autoencoder to generate a plurality of low-dimensional vectors using temporal regularization, wherein each of the plurality of low-dimensional vectors correspond to a period in the time series data (e.g., 24 hours). Additionally, the autoencoder may determine whether a change point occurs in a seasonal pattern of the time series data by determining whether the one or more change points occur in a seasonal pattern of the time series data based on the plurality of low-dimensional vectors. In a further example, generating the plurality of low-dimensional vectors using temporal regularization may include generating, by an encoder, an input vector for each period of the time series data, calculating a minimized summated difference between each period of the time-series data and a reconstructed version of the input vector, calculating a summated difference between two consecutive encoded periods of the time-series data, and generating, by a decoder, the plurality of low-dimensional vectors based on the minimized summated difference between each period of the time series data and the reconstructed version of the input vector and the summated difference between the two consecutive encoded periods of the time series data.

In a further example, generating the input vector for each period of the time series data further includes calculating an inner product between a weight matrix for a current period of the time-series data and an output of a previous weight matrix for a previous period of the time-series data, applying a non-linear function to the inner product, and determining corresponding parameters for the weight matrix based on a gradient descent using back-propagation.

In a further example, calculating the summated difference between the two consecutive encoded periods of the time-series data further includes applying regularization on one or more weights of a network, and applying a penalization a difference between a low-dimensional vector of two consecutive periods.

In a further example, determining whether the one or more change points occur in the seasonal pattern of the time-series data based on the plurality of low-dimensional vectors further includes determining a location for each of the plurality of low-dimensional vectors; and performing a hierarchical clustering procedure for the plurality of low-dimensional vectors based on the location for each of the plurality of low-dimensional vectors.

In a further example, performing the hierarchical clustering procedure for the plurality of low-dimensional vectors based on the location for each of the plurality of low-dimensional vectors may further include calculating a silhouette score based on a mean pairwise distance of the location for each of the plurality of low-dimensional vectors in a cluster and a mean distance of each location for each of the plurality of low-dimensional vectors in a neighboring cluster, determining whether the silhouette score satisfies a hyper-parameter threshold, and selecting a partition based on a determination that the silhouette score satisfies the hyperparameter threshold.

In block 640, the method 600 may include adjusting a baseline prediction of the application performance metric for the weekend time period. In an aspect, for example, the computing device 120 and/or the processor 124 may execute the monitoring component 130 and/or the adjustment component 136 to adjust the baseline prediction of the application performance metric for the weekend time period 204, 304, 308, 404, 408. For example, at sub-block 642, the block 640 may include increasing a predicted range of the metric during the weekend time period. For instance, the adjustment component 136 may increase the predicted range by decreasing the lower dynamic threshold 520 or increasing the upper dynamic threshold 530 for a weekend time period. As another example, in sub-block 644, the block 640 may include inferring a weekly seasonality based on the weekend time period. The baseline prediction may be based on the weekly seasonality. For instance, the adjustment component 136 may infer a weekly seasonality for the time series 410. The adjustment component 136 may then determine the lower dynamic threshold 520 and the upper dynamic threshold 530 based on the weekly seasonality.

In block 650, the method 600 may include sending an alert based on a deviation of a value of the application performance metric from the adjusted baseline prediction. In an aspect, for example, the computing device 120 and/or the processor 124 may execute the monitoring component 130 and/or alerting component 138 to send the alert 162 to a user 160 based on a deviation of a value of the application performance metric from the adjusted baseline prediction. For example, the alerting component 138 may send the alert 162 when a current value of the metric is outside of a range defined by the lower dynamic threshold 520 and the upper dynamic threshold 530. In an aspect, for the weekend time period 204, 304, 404, the alerting component 138 may silence alerts, for example, when the value of the metric during the weekend time period is unpredictable based on the available time series.

In block 660, the method 600 may optionally include adjust computing resources for the application in response to sending the alert. In an aspect, for example, the computing device 120 and/or the processor 124 may execute the monitoring component 130 to adjust computing resources for the application in response to sending the alert 162. For instance, the monitoring component 130 may request additional virtual machines for the application. As another example, the monitoring component 130 may rollback a deployment if the deployment is a cause of the problem. As another example, the monitoring component 130 may decide to restart a web role or a service. In an aspect, the alert 162 may indicate a suggested or default action and allow an operator to approve or reject the action.

In block 670, the method 600 may optionally include confirming a seasonality by applying a FFT seasonality computation to the time series of the application performance metric after collecting the time series of the application performance metric for a period greater than two weeks. In an aspect, for example, the computing device 120 and/or the processor 124 may execute the monitoring component 130 to confirm the weekly seasonality of the time series 210, 310, or 410 by applying a FFT seasonality computation to the time series 210, 310, or 410 of the application performance metric after collecting the time series of the application performance metric for a period greater than two weeks. That is, once more than two weeks of data is available, the FFT seasonality computation may be able to correlate data for multiple periods to confirm a weekly seasonality.

Figure 7:
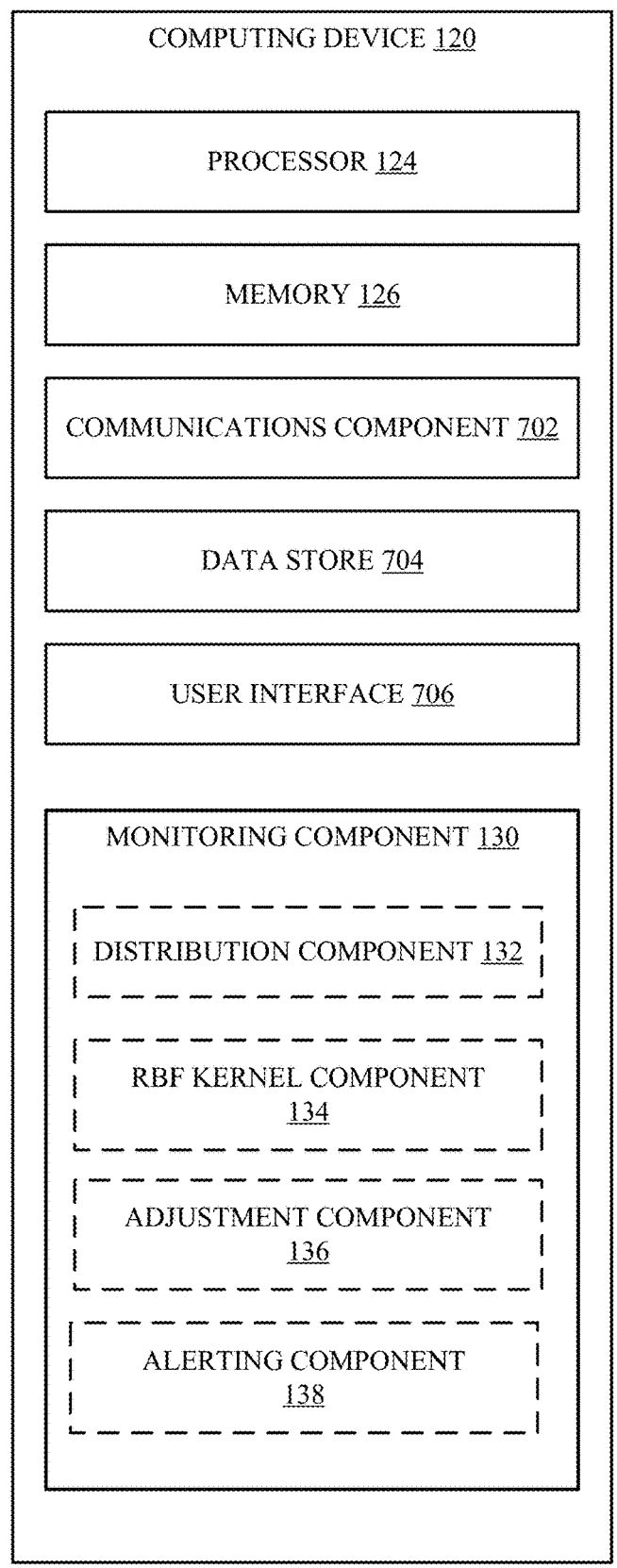
FIG. 7 is a schematic diagram of an example of a computing device for performing functions described herein.

FIG. 7 illustrates an example of computing device 120 including additional optional component details as those shown in FIG. 1. In one example, computing device 120 may include processor 124 for carrying out processing functions associated with one or more of components and functions described herein. Processor 124 can include a single or multiple set of processors or multi-core processors. Moreover, processor 124 can be implemented as an integrated processing system and/or a distributed processing system.

Computing device 120 may further include memory 126, such as for storing local versions of applications being executed by processor 124, related instructions, parameters, etc. Memory 126 can include a type of memory usable by a computer, such as random access memory (RAM), read only memory (ROM), tapes, magnetic discs, optical discs, volatile memory, non-volatile memory, and any combination thereof. Additionally, processor 124 and memory 126 may include and execute an operating system executing on processor 124, one or more applications, such as monitoring component 130, distribution component 132, RBF kernel component 134, adjustment component 136, alerting component 138 and/or components thereof, as described herein, and/or other components of the computing device 120.

Further, computing device 120 may include a communications component 702 that provides for establishing and maintaining communications with one or more other devices, parties, entities, etc. utilizing hardware, software, and services as described herein. Communications component 702 may carry communications between components on computing device 120, as well as between computing device 120 and external devices, such as devices located across a communications network and/or devices serially or locally connected to computing device 120. For example, communications component 702 may include one or more buses, and may further include transmit chain components and receive chain components associated with a wireless or wired transmitter and receiver, respectively, operable for interfacing with external devices. For example, communications component 702 can carry communications between the monitoring component 130, etc. executing on another device (or the same device), etc., as described in various examples herein.

Additionally, computing device 120 may include a data store 704, which can be any suitable combination of hardware and/or software, that provides for mass storage of information, databases, and programs employed in connection with examples described herein. For example, data store 704 may be or may include a data repository for applications and/or related parameters not currently being executed by processor 124, may include the time-series data repository 106, etc. In addition, data store 704 may be a data repository for an operating system, application, such as the monitoring component 130, and/or components thereof, etc. executing on the processor 124, and/or one or more other components of the computing device 120.

Computing device 120 may also include a user interface component 706 operable to receive inputs from a user of computing device 120 and further operable to generate outputs for presentation to the user (e.g., via a display interface to a display device). User interface component 706 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 7006 may include one or more output devices, including but not limited to a display interface, a speaker, a haptic feedback mechanism, a printer, any other mechanism capable of presenting an output to a user, or any combination thereof.

Computing device 120 can also include a monitoring component 130 for collecting a time series of an application performance metric for a period of less than two weeks, a distribution component 132 for determining a daily distribution for each day within the period, a RBF kernel component 134 for determining that the daily distribution includes a weekend time period that has a different daily distribution than a time period before or after the weekend time period, an adjustment component 136 for adjusting a baseline prediction of the application performance metric for the weekend time period, and an alerting component 138 for sending an alert based on a deviation of a value of the application performance metric from the adjusted baseline prediction, as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computing device for managing seasonal performance metric alerts, comprising:
   a memory storing one or more parameters or instructions; and
   at least one processor coupled to the memory, wherein the at least one processor is configured to:
   collect a time series of an application performance metric for a period of less than two weeks;
   determine daily distributions for each day within the period;
   apply a radial basis function (RBF) kernel-based change point detection to the daily distributions to determine that the daily distributions include a weekend time period that has a different daily distribution than a time period before or after the weekend time period, wherein the RBF kernel-based change point detection utilizes a sliding window of 24 hours;
   adjust a baseline prediction of the application performance metric for the weekend time period; and
   send an alert based on a deviation of a value of the application performance metric from the adjusted baseline prediction.

2. The computing device of claim 1, wherein the processor is configured to:
   identify a first time period before the weekend time period;
   identify a second time period after the weekend time period; and
   determine that the daily distribution for the first time period is similar to the daily distribution of the second time period and different than the daily distribution of the weekend time period.

3. The computing device of claim 1, wherein the weekend time period is between 22 and 50 hours.

4. The computing device of claim 1, wherein the processor is configured to silence alerts during the weekend time period.

5. The computing device of claim 1, wherein the processor is configured to adjust the baseline prediction of the application performance metric for the weekend time period by increasing a predicted range of the application performance metric during the weekend time period.

6. The computing device of claim 1, wherein the processor is configured to determine a season/period by applying a fast Fourier transform (FFT) seasonality computation to the time series of the application performance metric after collecting the time series of the application performance metric for a period greater than two weeks.

7. The computing device of claim 1, wherein the processor is configured to adjust computing resources for the application in response to sending the alert.

8. The computing device of claim 1, wherein the processor is configured to infer a weekly seasonality based on the weekend time period, wherein the baseline prediction is based on the weekly seasonality.

9. A computer-implemented method for managing seasonal performance metric alerts, comprising:
   collecting a time series of an application performance metric for a period of less than two weeks;
   determining daily distributions for each day within the period;
   applying a radial basis function (RBF) kernel-based change point detection to the time series to determine that the daily distributions include a weekend time period that has a different daily distribution than a time period before or after the weekend time period, wherein the RBF kernel-based change point detection utilizes a sliding window of 24 hours;
   adjusting a baseline prediction of the application performance metric for the weekend time period; and
   sending an alert based on a deviation of a value of the application performance metric from the adjusted baseline prediction.

10. The computer-implemented method of claim 9, wherein determining that the daily distribution includes the weekend time period comprises:
    identifying a first time period before the weekend time period;
    identifying a second time period after the weekend time period; and
    determining that the daily distribution for the first time period is similar to the daily distribution of the second time period and different than the daily distribution of the weekend time period.

11. The computer-implemented method of claim 9, wherein the weekend time period is at least 24 hours.

12. The computer-implemented method of claim 9, further comprising silencing alerts during the weekend time period.

13. The computer-implemented method of claim 9, wherein adjusting the baseline prediction of the application performance metric for the weekend time period comprises increasing a predicted range of the application performance metric during the weekend time period.

14. The computer-implemented method of claim 9, further comprising confirming a seasonality by applying a fast Fourier transform (FFT) seasonality computation to the time series of the application performance metric after collecting the time series of the application performance metric for a period greater than two weeks.

15. The computer-implemented method of claim 9, further comprising adjusting computing resources for the application in response to sending the alert.

16. The computer-implemented method of claim 9, wherein adjusting the baseline prediction of the performance metric comprises inferring a weekly seasonality based on the weekend time period, wherein the baseline prediction is based on the weekly seasonality.

17. A non-transitory computer-readable medium storing code executable by one or more processors for managing a knowledge graph, comprising code for:
    collecting a time series of an application performance metric for a period of less than two weeks;
    determining daily distributions for each day within the period;
    applying a radial basis function (RBF) kernel-based change point detection to the time series to determine that the daily distributions include a weekend time period that has a different daily distribution than a time period before or after the weekend time period, wherein the RBF kernel-based change point detection utilizes a sliding window of 24 hours;
    adjusting a baseline prediction of the application performance metric for the weekend time period; and
    sending an alert based on a deviation of a value of the application performance metric from the adjusted baseline prediction.

18. The non-transitory computer-readable medium of claim 17, wherein the code for determining that the daily distribution includes a weekend time period comprises code for:
    identifying a first time period before the weekend time period;

identifying a second time period after the weekend time period; and determining that the daily distribution for the first time period is similar to the daily distribution of the second time period and different than the daily distribution of the weekend time period.

\* \* \* \* \*